US011258633B2

(12) United States Patent
Hartwich et al.

(10) Patent No.: US 11,258,633 B2
(45) Date of Patent: Feb. 22, 2022

(54) TIMESTAMP UNIT AND COMMUNICATION CONTROL UNIT FOR A USER STATION OF A COMMUNICATION NETWORK

(71) Applicant: Robert Bosch GmbH, Stuttgart (DE)

(72) Inventors: Florian Hartwich, Reutlingen (DE); Arthur Mutter, Neuhausen (DE); Christian Horst, Dusslingen (DE)

(73) Assignee: Robert Bosch GmbH, Stuttgart (DE)

( * ) Notice: Subject to any disclaimer, the term of this patent is extended or adjusted under 35 U.S.C. 154(b) by 60 days.

(21) Appl. No.: 16/631,601

(22) PCT Filed: Jul. 19, 2018

(86) PCT No.: PCT/EP2018/069590
§ 371 (c)(1),
(2) Date: Jan. 16, 2020

(87) PCT Pub. No.: WO2019/016299
PCT Pub. Date: Jan. 24, 2019

(65) Prior Publication Data
US 2020/0186386 A1 Jun. 11, 2020

(30) Foreign Application Priority Data
Jul. 21, 2017 (DE) .......................... 202017104362.2

(51) Int. Cl.
*H04L 12/407* (2006.01)
*H04J 3/06* (2006.01)
(Continued)

(52) U.S. Cl.
CPC .......... *H04L 12/407* (2013.01); *H04J 3/0664* (2013.01); *H04L 2012/40215* (2013.01)

(58) Field of Classification Search
None
See application file for complete search history.

(56) References Cited

U.S. PATENT DOCUMENTS

2002/0152327 A1* 10/2002 Kagan ..................... H04L 49/90
709/250
2009/0310726 A1* 12/2009 Alankry ................ H04J 3/0697
375/359

(Continued)

FOREIGN PATENT DOCUMENTS

CN 102075318 A 5/2011
JP 2011004276 A 1/2011
(Continued)

OTHER PUBLICATIONS

International Search Report for PCT/EP2018/069590, dated Oct. 16, 2018.
(Continued)

*Primary Examiner* — Jay L Vogel
(74) *Attorney, Agent, or Firm* — Norton Rose Fulbright US LLP; Gerard Messina

(57) ABSTRACT

A timestamp unit and a communication control unit for a user station. The timestamp unit includes a memory, which cyclically stores a timestamp of a message, which is transmitted via a communication network, an address counter, which is incrementable with each storing of a timestamp of a message, so that the value of the address counter corresponds to an address at which the timestamp is stored in the memory, a first interface to a host control unit via which the timestamp of a message is capturable, and a second interface to a communication control unit, which creates or reads at least one message for/from the user station, the interface including a connection for receiving a trigger signal from the communication control unit, which prompts the capturing of a timestamp, and a connection for transmitting a signal to the communication control unit, which includes the value of the address counter.

16 Claims, 3 Drawing Sheets

(51) Int. Cl.
*H04L 12/40* (2006.01)
*H04L 29/12* (2006.01)

(56) References Cited

U.S. PATENT DOCUMENTS

| | | | |
|---|---|---|---|
| 2011/0211593 A1* | 9/2011 | Pepper | H04L 43/04 370/474 |
| 2012/0290166 A1* | 11/2012 | Wallace | G07C 5/00 701/29.2 |
| 2013/0191701 A1* | 7/2013 | Mueller | G06F 11/10 714/764 |
| 2014/0298070 A1 | 10/2014 | Kim et al. | |
| 2015/0032914 A1* | 1/2015 | Brewerton | G06F 13/28 710/25 |
| 2015/0063375 A1* | 3/2015 | Tzeng | H04J 3/0667 370/512 |
| 2016/0373261 A1 | 12/2016 | Tschache et al. | |
| 2017/0188262 A1* | 6/2017 | Roehrle | H04W 4/80 |
| 2017/0230195 A1* | 8/2017 | Nickel | H04L 12/413 |

FOREIGN PATENT DOCUMENTS

| | | | |
|---|---|---|---|
| JP | 2012178770 A | 9/2012 | |
| JP | 2017069941 A | 4/2017 | |
| KR | 100764951 B1 | 10/2007 | |
| WO | 2008015492 A1 | 2/2008 | |
| WO | 2016062560 A1 | 4/2016 | |
| WO | WO-2016062560 A1 * | 4/2016 | ....... H04L 12/40189 |
| WO | 2017110056 A1 | 6/2017 | |

OTHER PUBLICATIONS

Florian Hartwich, "Can Frame Time-Stamping—Supporting Autosar Time Base Synchronization-", Can in Automation (CIA), ICC 2017, 2017, pp. 04-1-04-5, XP855511612.

Gabriela Breaban et al., "Time Synchronization For an Emulated Can Device On a Multi-Processor System on Chip", Microprocessors and Microsystems, BD. 52, 2017, pp. 523-533, XP055511902.

* cited by examiner

TIMESTAMP UNIT AND COMMUNICATION CONTROL UNIT FOR A USER STATION OF A COMMUNICATION NETWORK

FIELD

The present invention relates to a timestamp unit and a communication control unit for a user station of a communication network, which enables the establishment of a global time basis in the communication network.

BACKGROUND INFORMATION

In serial communication networks or bus systems such as, for example, CAN, FlexRay, Ethernet, etc., data are exchanged between various users of the communication network or of bus system according to a specific protocol. In the CAN bus system, for example, messages are transmitted with the aid of the CAN protocol and/or CAN FD protocol, as is described in the Standard ISO11898-1:2015 as CAN Protocol Specification with CAN FD. Presently, the CAN bus system is widely common for the communication between sensors and control units. It is used, for example, in automobiles or in automation systems.

In such serial communication networks, it is necessary for the control units connected to the network to synchronize their local time bases to one another in order to arrive at a global time basis. This synchronization takes place, for example, via the exchange of particular synchronization messages between the users of the serial communication network.

The continually increasing number of electronic control units (ECU=electronic control unit) in vehicles or in automation systems increases the number of user stations of the serial communication network or bus system and, as a result, also increases the complexity of the synchronization of the time bases of the user stations. AUTOSAR (AUTomotive Open System ARchitechture) has therefore been developed as an open industry standard which, with its standards, enables a modular development method in which the implementation of software tasks in the network is distributable among various electronic control units.

The method "time synchronization over CAN", CanTSyn, is described in the AUTOSAR Standard. The Standard CiA 603 "Message-time stamp" ("Frame time-stamping") of "CAN in Automation" describes how the AUTOSAR method is able to function with greater precision if a CAN controller, which is used for controlling the communication of a user station in a CAN network, includes particular functions, which go beyond the functions that are established in the CAN protocol standard. These functions are the detection of the synchronization messages and storing the time markers or time stamps at particular points in time when sending and receiving these messages.

The complexity of the hardware for the CAN controller increases significantly depending on the number of time bases or electronic control units (ECU) to be synchronized. The reason for this is, for example, that changes would be necessary which would also influence driver software of secondary levels and would therefore force changes to this software. Moreover, not all CAN controllers require the functions necessary for CiA 603. Also, already many AUTOSAR systems are presently in operation, in which the CAN controllers offer no hardware support for a synchronization of the time bases, as it is provided for CAN controllers, which is conventional according to the new standard CiA 603.

SUMMARY

It is an object of the present invention to provide a timestamp unit and a communication control unit for a user station of a communication network, which solves the aforementioned problems. A timestamp unit and a communication control unit for a user station of a communication network are, in particular, to be provided, which enables the use of an electronic control unit (ECU), which functions according to the CiA 603 standard, also in already existing systems, preferably without the integration requiring the need for an interruption of the existing system.

The object may be achieved by an example timestamp unit for a user station of a communication network in accordance with the present invention. The timestamp unit includes a memory, which is designed to cyclically store a timestamp of a message, which is transmitted via the communication network, an address counter, which is incrementable with each storing of a timestamp of a message so that the value of the address counter corresponds to an address at which the timestamp is stored in the memory, a first interface to a host control unit, via which the timestamp of a message is able to be captured, and a second interface to a communication control unit of the communication network, which is designed to create at least one message for or to read at least one message from the user station, the interface including at least one connection for receiving a trigger signal from the communication control unit, which prompts the capturing of a timestamp, and the interface including a connection for sending a signal to the communication control unit, which includes the value of the address counter.

With the timestamp unit, a separate unit is provided, which may be used in the serial network as needed. The timestamp unit in this case is designed in such a way that a time basis of the timestamp unit may be used for at least one additional timestamp unit of the serial network.

In this way, a communication control unit already existing in the serial network is, on the one hand, retrofittable to the extent that it offers the functions of the timestamp unit. On the other hand, the separate timestamp unit may also be used by multiple communication control units of the serial network. These two possibilities each contribute to the cost reduction in implementing the serial network.

The communication control unit of the serial network needs to be additionally configured or replaced only in the event the timestamp unit is omitted in the serial network.

With the separate timestamp unit, it is possible to save silicon surface area in the communication control unit of the serial network. It is also possible to save silicon surface area by reserving the separate timestamp unit and, therefore, its functions only for when the functions of the separate timestamp unit are actually needed.

In addition, the adaption of the development in various designs of the functions of the timestamp unit is simplified by the design of the timestamp unit as a separate unit. An expansion of a communication network by an additional communication control unit with or without a timestamp unit is also possible without interrupting the communication in the network.

Advantageous additional embodiments of the timestamp unit are described herein.

According to one embodiment variant of the present invention, the timestamp unit has a separate time basis. According to another embodiment variant of the present invention, the timestamp unit has a connection for outputting a signal to an additional timestamp unit, which is designed to use the signal instead of a separate time basis. The separate time basis in both variants may be designed as a 32 bit wide counter, which is incrementable in adjustable time intervals, which is in a time range of at least one nanosecond to not more than 1 microsecond.

The time stamp unit may also include a connection for receiving and processing a signal, which is output by an external time basis in order to use the signal in the timestamp unit instead of a separate time basis, and the external time basis being designed as a 32 bit wide counter, which is incremented in adjustable time intervals, which are in a time range of at least 1 nanosecond to not more than 1 microsecond.

The interface in the timestamp unit may have a connection for receiving and for processing a trigger signal from the communication control unit, which prompts the capturing of a timestamp for a message received from the communication control unit, and the interface including a connection for receiving and for processing a trigger signal from the communication control unit, which prompts the capturing of a timestamp for a message sent from the communication control unit.

It is also possible that the interface includes a connection for receiving and for processing a trigger signal from the communication control unit, which prompts the capturing of a timestamp for a message received from the communication control unit and for a message sent from the communication control unit.

In one embodiment variant, the trigger signal takes for messages received and/or sent from the communication control unit only time synchronization messages into consideration. In another embodiment variant, the trigger signal takes all messages received and/or sent from the communication control unit into consideration.

According to another exemplary embodiment, the timestamp unit also has a functional unit, which has a bit standing ready for each memory address of a respective register 1 to N of the timestamp memory, which is set each time when one of the timestamps is stored in memory 500, and has a bit standing ready, which is set when one of the timestamps is stored in the memory for which the bit is still not set.

The aforementioned task may also be achieved by an example communication control unit for a user station of a communication network in accordance with the present invention. The communication control unit has a message memory, which is designed to store at least one message created or to be read by the communication control unit for/from a user station, and an interface to a timestamp unit, which is designed for carrying out a time synchronization of the messages, the interface including at least one connection for creating and sending a trigger signal, which prompts the capturing of a timestamp by the timestamp unit, which includes a memory for cyclically storing a timestamp of a message, which is transmitted via the communication network, and an address counter, which is incremented with each storing of a timestamp of a message so that the value of the address counter corresponds to an address at which the timestamp is stored in the memory, and the interface including a connection, which is designed to receive a signal from the timestamp unit, which includes the value of the address counter, and is designed to store the signal in the message memory.

The communication control unit yields the same advantages as previously cited with respect to the timestamp unit.

The previously described timestamp unit and the previously described communication control unit may be part of a user station for a communication network, the timestamp unit and the communication control unit being integrated as separate modules on a semiconductor chip. Alternatively, the timestamp unit and the communication control unit may be provided as separate modules on different semiconductor chips.

The above-described timestamp unit and/or the above-described communication control unit may be part of a system, which also includes a communication line for the serial transmission of messages in a communication network, and at least two user stations, which are connected via the communication line to one another in such a way that they are able to communicate with one another, at least one of the at least two user stations being designed to connect to the timestamp unit and/or including the communication control unit.

In this case, it is possible that the communication network is a network, in which an exclusive, collision-free access of a user station to a bus line of the communication network is at least temporarily ensured.

Additional possible implementations of the present invention also include combinations not explicitly cited of features or specific embodiments with respect to the exemplary embodiments described previously or below. In this case, those skilled in the art will also add individual aspects as improvements on or additions to the respective basic form of the present invention.

BRIEF DESCRIPTION OF THE DRAWINGS

The present invention is described in greater detail below with reference to the figures and based on exemplary embodiments.

Unless otherwise indicated, identical or functionally identical elements are provided with the same reference numerals.

DETAILED DESCRIPTION OF EXAMPLE EMBODIMENTS

Figure 1:
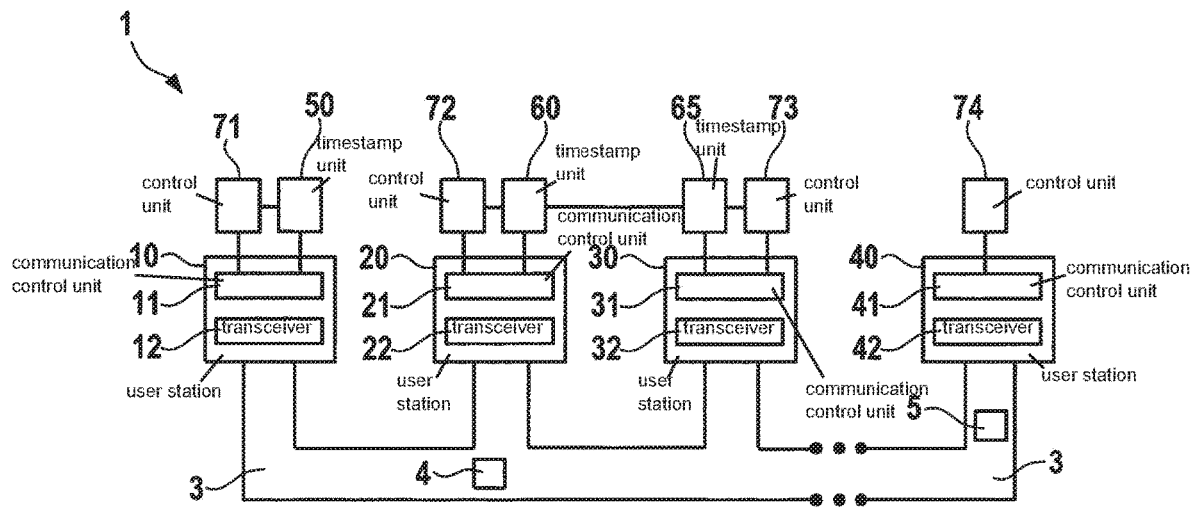
FIG. 1 shows a simplified block diagram of a system that includes a communication network according to a first exemplary embodiment.

FIG. 1 shows a specific example of a system 1 including a serial communication network, which may, for example, be a CAN bus system, a CAN FD bus system, an Ethernet communication network, a FlexRay communication network, etc. System 1 may be used in a vehicle, in particular, in a motor vehicle, in an aircraft, etc., or in the hospital, etc. or in an automation system for the production or treatment or handling of objects, etc.

In terms of the communication network, system 1 in FIG. 1 has a communication line 3, via which messages 4 or synchronization messages 5 are exchangeable between a multitude of user stations 10, 20, 30, 40. Four user stations 10, 20, 30, 40 are present in the specific example of FIG. 1. One timestamp unit 50 is provided for user station 10. One timestamp unit 60 is provided for user station 20. One timestamp unit 65 is provided for user station 30. No timestamp unit is provided for user station 40. User stations 10, 20, 30, 40 and bus line 3 implement a communication of host processors or host control units 71, 72, 73, 74, which are assigned to respective user stations 10, 20, 30, 40, as illustrated in FIG. 1.

Messages 4, 5 are transmitted in the form of signals between individual user stations 10, 20, 30, 40. Host processors or host control units 71, 72, 73, 74 may, for example, be control units or electronic control units (ECU) or display devices, etc., of a motor vehicle, of an automation system, etc.

As shown in FIG. 1, user station 10 has a communication control unit 11 and a transceiver device 12. User station 20 has a communication control unit 21 and a transceiver device 22. User station 30 has a communication control unit 31 and a transceiver device 32. User station 40 has a communication control unit 41 and a transceiver device 42. Transceiver devices 12, 22, 32, 42 of user stations 10, 20, 30, 40 are each directly connected to bus line 3, even if this is not depicted in FIG. 1.

Communication control unit 11 is used to control a communication of user station 10 via bus line 3 with at least one other user station of user stations 20, 30, 40 connected to bus line 3. Communication control unit 11 may, with the exception of the designs described below, be designed, in particular, as a conventional CAN controller or CAN FD controller or a TTCAN controller having AUTOSAR function. Communication control units 21, 31, 41 are, with the exception of the designs described below, designed in the same manner as communication control unit 11.

Transceiver device 12 may be designed, in particular, as a conventional CAN transceiver or CAN-FD transceiver or TTCAN transceiver. Transceivers 22, 32, 42 are designed in the same manner as transceiver 12.

Timestamp units 50, 60, 65 in the example of FIG. 1 are depicted as modules separate from respective assigned user stations 10, 20, 30. In this case, it is possible for timestamp units 50, 60, 65 and respective assigned user stations 10, 20, 30, more precisely, their communication control unit 11, 21, 31, to be assigned to and/or to be provided on separate, integrated circuits or chips, in particular, on semiconductor chips. Alternatively, it is possible, however, for timestamp units 50, 60, 70 to be provided and/or integrated as a separate module on the same integrated circuit or on the same chip, in particular, on the semiconductor chip, as respective assigned user stations 10, 20, 30, more precisely, their communication control unit 11, 21, 31.

Figure 2:
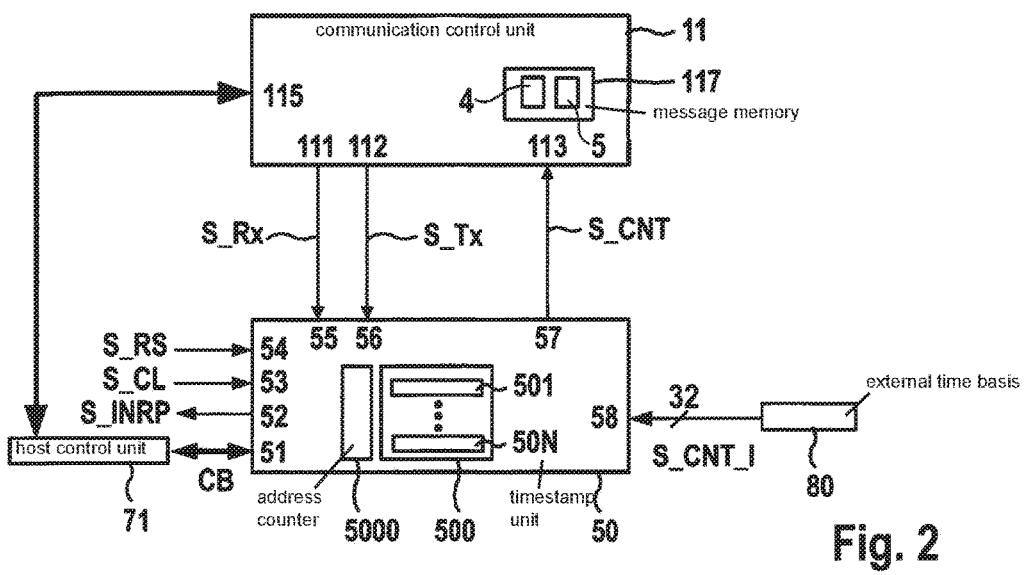
FIG. 2 shows a simplified block diagram of an interconnection of a first timestamp unit in the communication network according to the first exemplary embodiment.

FIG. 2 shows in a block diagram the communication control unit 11 and its connection to timestamp unit 50 in greater detail. The functions necessary for CiA 603 are installed in timestamp unit 50. Thus timestamp unit 50 provides hardware timestamp functions for communication control unit 11. For this purpose, timestamp unit 50 provided separately from communication control unit 11 includes connections 51 through 58. In contrast, communication control unit 11 is unchanged except for connections 111, 112, 113, compared to the structure of a conventional CAN controller or of a CAN-FD controller or of a TTCAN controller that includes the AUTOSAR function. Connections 111, 112, 113 are provided for signals S_TX, S_RX and S_CNT at connections 55 through 57 of timestamp unit 50, which are explained in greater detail below. In this way, it is possible for an interface 115 of communication control unit 11 to host control unit 71 to remain unchanged.

Timestamp unit 50 has with connection 51 a separate CPU interface CHI to a CPU of host control unit 71. In this case, CHI stands for interface of a host control unit (CHI=controller host interface). CPU stands for central processing unit (CPU=central processing unit). In this way, timestamp unit 50 is connected to the CPU bus CB of host control unit 71. Via connection 51 as the CPU interface CHI, it is possible to carry out a configuration and/or a control and/or a monitoring of timestamp unit 50.

During the operation of user station 10 and timestamp unit 50, a timestamp memory 500 having N registers stores a number from 1 through N time markers or timestamps, namely timestamps 501 through 50N, which timestamp unit 50 is able to read via connection 51 as described in greater detail below. Each of timestamps 501 through 50N has a number of 32 bits that corresponds to half a classic CAN data field. In terms of CAN, timestamps 501 through 50N are stored at the end of a message 5 at the point in time of the last EOF bit, which indicates the end of message 5. Timestamp memory 500 is addressed by an address counter 5000.

Timestamp unit 50 optionally outputs an interrupt signal S_INRP at connection 52, which may also be referred to as interrupt signal S_INRP, to external units. The units may include, in particular, communication control unit 11. The units may include, in particular host control unit 71. Interrupt signal S_INRP potentially indicates the capturing of a new timestamp. Alternatively, interrupt signal S_INRP may also indicate that one timestamp of timestamps 501 through 50N has been overwritten before the timestamp has been read. Interrupt signal S_INRP is not required for a time basis synchronization.

Timestamp unit 50 receives and processes at connection 53 a clock signal S_CL, with which the digital circuit is operated. The clock period is at least 1 nanosecond and not more than 1 microsecond.

Timestamp 50 receives and processes at connection 54 a reset signal S_RS, which may also be referred to as reset signal S_RS and is used for resetting the digital circuit and the timestamp memory 500 to zero. The normal operation of the communication network may then start.

Communication control unit 11 provides a trigger S-Rx for connection 55 of timestamp unit 50 via connection 111. With each reception of a signal corresponding to a synchronization message 5, in particular, according to the CiA 603 standard, from bus line 3 or via transceiver device 12, trigger S_Rx ensures that a timestamp is captured and is stored in a register of timestamp memory 500 as one of timestamps 501 through 50N. Each time a capturing of a timestamp 501 through 50N is triggered, address counter 5000 of the register of timestamp memory 500 is incremented. The value of address counter 5000 thus corresponds to register 1 through N, in which timestamp 501 through 50N has been stored in timestamp memory 500.

Communication control unit 11 activates trigger S_Rx for relevant messages 4, 5. A relevant message 4, 5, for example, is when a message is received, which is detected as a synchronization message 5 or SYNC message, as previously described. Relevant messages 4, 5 are detected with respect to a CAN communication control unit 11 by a CAN acceptance filtering.

Alternatively, trigger S_Rx is not designed only for receiving signals corresponding to a synchronization message 5, in particular, according to the CiA 603 standard, but for all messages 4, 5 received from communication control unit 11. However, this is not necessary for a time synchronization, since for this purpose the capturing of the synchronization messages is sufficient.

In addition, communication control unit 11 in the example of FIG. 2 provides a trigger S-Tx via connection 112 for connection 56 of timestamp unit 50. With each sending of a signal corresponding to a synchronization message 5, in particular, according to the CiA 603 standard, to bus line 3 or via transceiver device 12 to bus line 3, trigger S_Tx causes a timestamp to be captured and is stored in timestamp memory 500 as one of timestamps 501 through 50N. Here too, address counter 5000 of timestamp memory 500 is incremented each time a capturing of a timestamp 501 through 50N is triggered.

Communication control unit 11 activates trigger S_Tx for relevant messages 4, 5. Trigger S_Tx is activated, for example, if relevant messages 4, 5 are transmitted from a correspondingly configured transmission memory.

Alternatively, trigger S_Tx is configured not only for sending signals corresponding to a synchronization message 5, in particular, according to the CiA 603 standard, but for all messages 4, 5 sent from communication control unit 11. However, this is not necessary for a time synchronization, since for this purpose the capturing of the synchronization messages is sufficient.

Alternatively, signals S_Rx and S_Tx may also be combined to form one signal.

From the last register address, i.e., the address at which the N-te timestamp 50N is stored, address counter 5000 runs over to zero. Timestamp memory 500 may therefore be designed as a ring buffer, for example. The counter content, i.e., the value S_CNT of counter 5000, is reported to communication control unit 11 via connection 57 of timestamp unit 50 and via connection 113 of communication control unit 11. The report may be configured according to one specific example as a 3 bit wide vector. In this specific example, timestamp memory 500 is designed to store 8 timestamps. If timestamp memory 500 is designed, for example, to store 16 timestamps, the report with the value S_CNT of counter 5000 is then designed, in particular, as a 4 bit wide vector. This combination of the width of the vector for value S_CNT of counter 5000 at connection 57 and number N of addresses for storing timestamps 501 through 50N in memory 500 is arbitrarily adaptable to the correspondingly required configuration.

The number N of the timestamp stored in timestamp memory 500 may be decided upon by a generic parameter. In this way, the size of timestamp unit 50 is determined. The resultant configuration of timestamp unit 50 may be carried out via connection 51 as the CPU interface CHI, as previously mentioned in general. However, signals S_Rx, S_Tx at the interface between communication control unit 11 and timestamp unit 50 are not changed as a result. In terms of the signal for value S_CNT of counter 5000, only the address counter width is changed by the generic parameter, as previously described.

The value of counter 5000 is stored in communication control unit 11 in a message memory 117, in which messages 4, 5 to be sent and messages 4, 5 received are also stored.

Timestamp unit 50 receives a timer counter input signal S_CNT_I from an external time basis 80 at a connection 58, which may also be referred to as a timer counter input vector. Timer counter input signal S_CNT_I, instead of an internal time basis, is available for timestamp unit 50. Timer counter input signal S_CNT_I, controlled by signals S_Rx and S_Tx, is stored as a timestamp value. In other words, 32 bit wide signal S_CNT_I is the time basis, which is stored as a time marker.

As a result of the previously described design of timestamp unit 50, only the value of counter 5000 is stored as the, for example, 3 bit long vector, in contrast to the conventional manner, and not the complete 32 bit long timestamp of timestamps 501 through 50N. Trigger signals S_Rx, S_Tx, which cause one of timestamps 501 through 50N to be stored, are supplied by communication control unit 11. Timestamp unit 50 supplies pieces of information regarding which timestamp belongs to which message 4, 5.

The individual elements of memory 500, i.e., timestamps 501 through 50N stored in memory 500, may also be read via connection 51 as CPU interface CHI.

Figure 3:
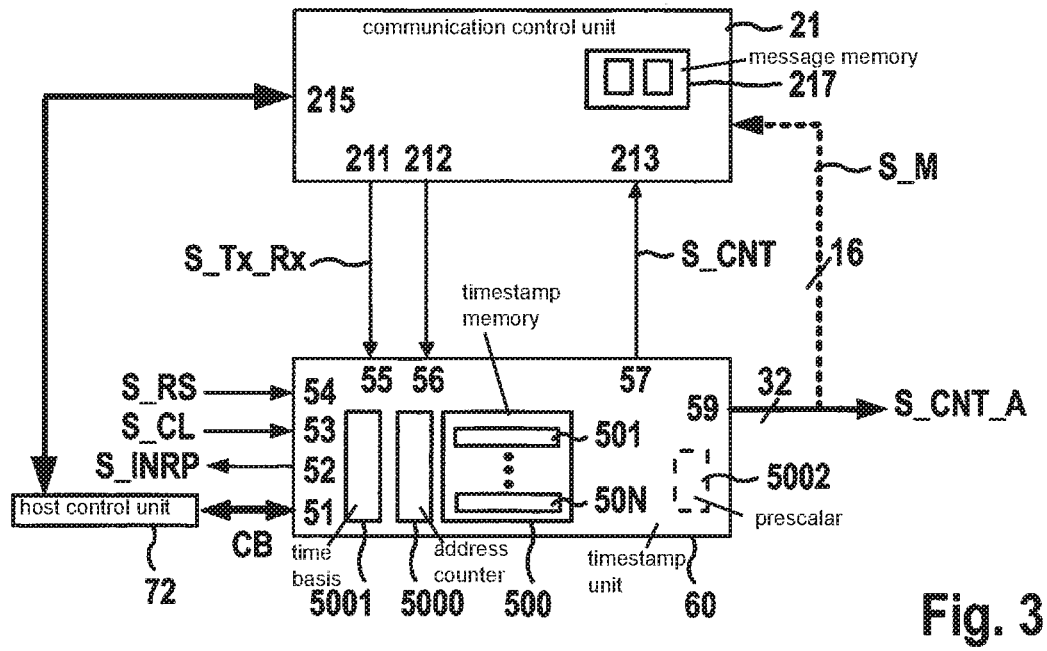
FIG. 3 shows a simplified block diagram of an interconnection of a second timestamp unit in the communication network according to the first exemplary embodiment.

FIG. 3 shows timestamp unit 60 in greater detail, which is connected to communication control unit 21 with connections 211, 212, 213 and their message memory 217. Communication control unit 21 is connected with a connection 215 to host control unit 72. Connections 211, 212, 213, 215 have, with the exception of the following described functions of connections 211, 212, the same function as connections 111, 112, 113, 115 of communication control unit 11. Message memory 217 has the same function as the message memory 117 of communication control unit 11. Timestamp unit 60 is constructed in large part in the same way as timestamp unit 50.

However, timestamp unit 60 has a separate time basis 5001 in contrast to timestamp unit 50. Thus, connection 58 to an external time basis 80 is not required for a timer counter input signal S_CNT_I, even if connection 58 may be optionally present. Time basis 5001 may be adjusted by way of a circuit synthesis via connection 51. Time basis 5001 is designed, in particular, in a CAN communication network, as a 32 bit wide counter, which is installable in timestamp unit 60. A counter having a smaller width, for example, a 16 bit wide counter, is also usable if this is sufficient for the required precision. A width greater than 32 bits may, of course, also be used if needed. Time basis 5001 is incremented in the same time value range as specified previously with respect to timestamp unit 50 for external time basis 80.

Timestamp unit 60 optionally has a prescaler 5002, via which per software the speed may be adjusted with which time basis 5001 is incremented. Time basis 5001 is incremented in steps of at least 1 nanosecond and not more than 1 microsecond.

As a further difference from timestamp unit 50, timestamp unit 60 has a connection 59, via which timestamp unit 60 outputs a timer counter output signal S_CNT_A, which may also be referred to as a timer counter output vector. Timer counter output signal S_CNT_A is generated from time basis 5001 and may, for example, be output to communication control unit 31 or to additional communication control units. Consequently, communication control unit 31 or additional communication control units require no separate time basis 5001. Timer counter output signal S_CNT_A may optionally be used, in addition or alternatively as signal S_M as a time basis for a timestamp having a lower resolution, in particular, for a timestamp having a 16 bit width, as it is used in time-triggered CAN (TTCAN), as is described in the international Standards ISO 11898-1 and ISO 11898-4.

Communication control unit 21 is also designed to output only one trigger signal S_Tx_Rx at connection 211 for messages 4, 5 sent and messages 4, 5 received. Thus, instead of separate trigger signals S_Rx, S_Tx for receiving and sending a synchronization message 5 or also a message 4, as described with respect to timestamp unit 50 of FIG. 2, only one trigger is used for both events in the case of timestamp unit 60 of FIG. 3. This trigger for both events may be transmitted between an arbitrary one of connections 211, 212 to an arbitrary one of connections 55, 56 of timestamp unit 60. The other connection pair 211, 55, 212, 56 then remains unused.

Timestamp unit 65 may be designed largely similar to timestamp unit 60. However, timestamp unit 65 has no time basis 5001, but receives signal S_CNT_A from timestamp unit 60 at its connection 58 as signal S_CNT_I.

Figure 4:
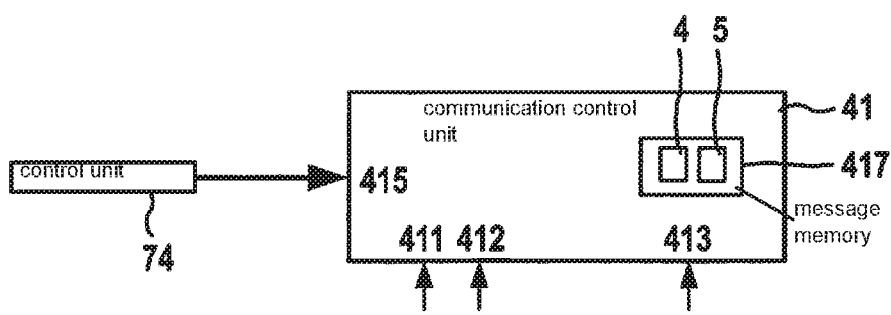
FIG. 4 shows a simplified block diagram of an interconnection of a fourth timestamp unit in the communication network according to the first exemplary embodiment.

FIG. 4 shows communication control unit 41 in greater detail, which uses no timestamp unit. Communication control unit 41 has connections 411, 412, 413, 415 and a message memory 417.

Connections 411, 412, 413, 415 are designed basically for the same function as connections 111, 112, 113, 115 of communication control unit 11 or connections 211, 212, 213, 215 of communication control unit 21. Message memory 417 has the same function as message memory 117, 217 of communication control units 11, 21.

However, connections 411, 412, 413 in communication control unit 41 are set at fixed values (for example, all 0). As a result, an operation of communication control unit 41 in the communication network is possible without the operation of the communication network being disrupted.

Timestamp units 50, 60, 65, 600, together with communication control units 11, 21, 31, 41, carry out a method for synchronizing the time bases in system 1.

According to one modification of the first exemplary embodiment, a shared timestamp unit 50 or a shared timestamp unit 60 or a shared timestamp unit 65 is provided for more than one communication control unit 11, 21, 31, 41. In this case, only one of communication control units 11, 21, 31, 41 need output trigger signals S_Rx, S_Tx, S_Tx_Rx. Alternatively, timestamp unit 50, 60, 65 may, however, also be designed to distinguish from which of communication control units 11, 21, 31, 41 trigger signals S_Rx, S_Tx, S_Tx_Rx come. Signal S_CNT at connection 57, i.e., the address value of timestamp memory 500, at which the timestamp just captured has been stored, may be output to all communication control units 11, 21, 31, 41. Alternatively, signal S_CNT at connection 57, i.e., the address value of timestamp memory 500, at which the timestamp just captured has been stored, may be output to only respectively affected communication control unit 11, 21, 31, 41.

Figure 5:
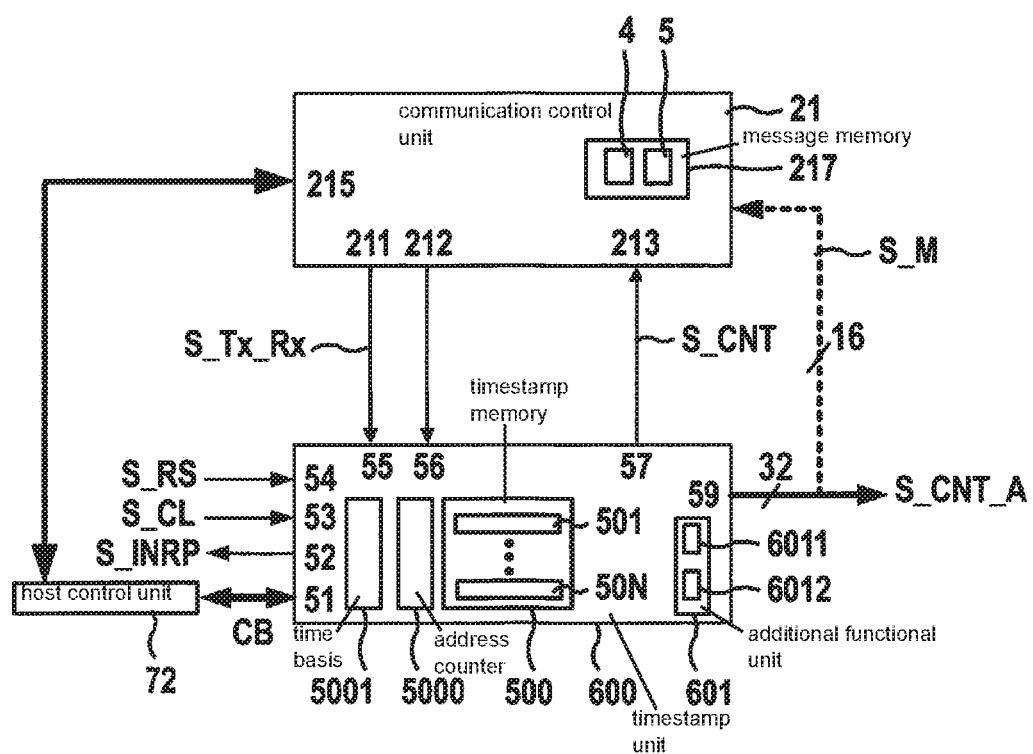
FIG. 5 shows a simplified block diagram of an interconnection of a timestamp unit according to a second exemplary embodiment.

FIG. 5 shows a timestamp unit 600 according to a second exemplary embodiment, which is usable, for example, instead of timestamp unit 60. Timestamp unit 600 is constructed in large part in the same manner as timestamp unit 60.

In contrast to timestamp unit 60, timestamp unit 600 according to the present exemplary embodiment has an additional functional unit 601. Additional functional unit 601 provides additional functions for timestamp unit 600, for example, a software debugging aid. The software debugging aid contains two bits 6011, 6012 per memory address of each register 1 through N of timestamp memory 500.

Bit 6011 is a NewDat bit, which is set each time associated timestamp 501 through 50N is stored in memory 500. Bit 6011 is reset by host control unit 72 when the associated timestamp of timestamps 501 through 50N has been read.

Bit 6012 is a DatLst bit, which is set when one of timestamps 501 through 50N is stored in memory 500, for which bit 6011 is still set. Bit 6012 indicates that a timestamp has been overwritten before the timestamp has been read out by host control unit 72.

Bits 6011, 6012, together with the storing of a new timestamp in memory 500, are reset by host control unit 72.

All previously described embodiments of system 1, of user stations 10, 20, 30, 40, of timestamp units 50, 60, 65, 600 and of the method carried out by these may be used individually or in all possible combinations. All features of the previously described exemplary embodiments and/or of their modifications may, in particular, be arbitrarily combined. The following modifications, in particular, are also conceivable.

The previously described system 1 according to the exemplary embodiments is described with reference to a bus system based on the CAN protocol. System 1 according to the exemplary embodiments may, however, alternatively or in addition, include another type of serial communication network, as also previously indicated. It is advantageous, but not a mandatory prerequisite, that in the communication network of system 1, at least for particular periods of time, an exclusive collision-free access of a user station 10, 20, 30 to a shared channel is ensured.

The communication network of system 1 according to the exemplary embodiments is, in particular, a CAN network or a TTCAN network or a CAN FD network or an Ethernet or a FlexRay bus system.

The number and arrangement of user stations 10, 20, 30, 40 and/or timestamp units 50, 60, 65, 600 in system 1 of the exemplary embodiments are arbitrary. Only user stations 10 or user stations 20 or user stations 40, etc., may, in particular, also be present in system 1 of the exemplary embodiments.

Timestamp units 50, 60, 65, 600 may each be pre-fitted in such a way that they are able to fulfill all functions previously described for individual timestamp units 50, 60, 65, 600. However, any other pre-fitting for at least one of the functions described is also conceivable. For each of individual timestamp units 50, 60, 65, 600, however, only connections 51 through 59 and time bases 80, 5001 or additional functional unit 601 are usable, which are required for the respective specific application.

What is claimed is:

1. A timestamp unit for a first user station of a communication network, the timestamp unit comprising:
   a memory;
   an address counter;
   a first interface by which the timestamp unit interfaces with a host control unit; and
   a second interface by which the timestamp unit interfaces with a communication control unit of the first user station;
   wherein:
      the timestamp unit is configured to receive, via the second interface and from the communication control unit, a respective trigger signal for each of one or more respective messages communicated between the first user station and one or more second user stations, the respective trigger signal triggering the timestamp unit to provide to the respective message a respective timestamp without the timestamp unit receiving the respective message, the providing of the respective timestamp being performed by the timestamp unit:
         storing the respective timestamp in the memory at a respective address of the memory; and transmitting to the communication control unit, via the second interface, an identification of the respective address without transmitting the respective timestamp to the communication control unit, the communication control unit being configured to subsequently obtain the respective timestamp from the timestamp unit using the host control unit and the first interface based on the identification of the respective address;

the timestamp unit is configured to cyclically use the addresses of the memory to store the timestamps;

the timestamp unit includes an address counter to generate the identifications of the addresses by being incremented with each storing of the respective timestamps in the memory so that a value of the address counter corresponds to the respective address at which the respective timestamp is stored in the memory; and the indications of the respective addresses of the timestamps are transmitted by the timestamp unit to the communication control unit by transmitting to the communication control unit the value to which the address counter is presently set.

2. The timestamp unit as recited in claim 1, wherein the timestamp unit includes, as a time basis that generates the respective timestamps, a 32 bit wide counter, which is incremented in adjustable time intervals in a time range of at least 1 nanosecond to not more than 1 microsecond.

3. The timestamp unit as recited in claim 1, further comprising:
a connection configured to receive and to process signals which are output from an external time basis to use as the timestamps that are stored in the memory, wherein the external time basis is a 32 bit wide counter, which is incremented in adjustable time intervals in a time range of at least 1 nanosecond to not more than 1 microsecond.

4. The timestamp unit as recited in claim 1, wherein the second interface includes a first connection by which the timestamp unit is configured to receive those of the trigger signals transmitted by the communication control unit which prompts the capturing of the timestamp for those of the messages that are received by the communication control unit from the one or more second user stations, and wherein the second interface includes a second connection by which the timestamp unit is configured to receive those of the trigger signals transmitted by the communication control unit which prompts the capturing of the timestamp for those of the messages that are sent from the communication control unit to the one or more second user stations.

5. The timestamp unit as recited in claim 1, wherein the second interface includes a single connection by which the timestamp unit is configured to receive the trigger signals transmitted by the communication control unit which prompts the capturing of the timestamp for both those of the messages that are received by the communication control unit from the one or more second user stations and those of the messages that are sent from the communication control unit to the one or more second user stations.

6. The timestamp unit as recited in claim 1, wherein the trigger signals are sent by the communication control unit for all synchronization messages, and not other messages, received by the communication control unit and sent from the communication control unit.

7. The timestamp unit as recited in claim 1, further comprising:
a functional unit which has a first bit standing ready for each memory address of a respective register of the timestamp memory which is set each time one of the timestamps is stored in the memory at the respective memory address and which is cleared each time one of the timestamps is read from the respective memory address of the memory, and the functional unit has a second bit standing ready which is set conditional upon one of the timestamps being stored in the memory at the memory address for which the first bit is still set.

8. A communication control unit of a first user station of a communication network, the communication control unit comprising:
a message memory in which the communication control unit is configured to store messages communicated between the communication control unit and one or more second user stations; and
an interface to a timestamp unit;
wherein:
the communication control unit is configured to transmit, via the interface, to the timestamp unit, and for each of one or more respective ones of the messages, a respective trigger signal to trigger the timestamp unit to, without the timestamp unit receiving the respective message, provide to the respective message a respective timestamp by (a) cyclically using addresses of a cyclical memory of the timestamp unit to store the respective timestamps at respective ones of the addresses, (b) using an address counter of the timestamp unit to generate respective identifications of the respective addresses by being incremented with each storing of the respective timestamps in the cyclical memory so that, for each the timestamps, a value of the address counter corresponds to the respective address at which the respective timestamp is stored in the cyclical memory, and (c) for each of the timestamps, transmitting, to the communication control unit and via the interface, the respective identification of the respective address without transmitting the respective timestamp to the communication control unit by transmitting the value to which the address counter is presently set; and
the communication control unit is configured to, subsequent to receiving the respective identification of the respective address, store the respective identification in the message memory and obtain the respective timestamp from the timestamp unit based on the identification of the respective address stored in the message memory.

9. A first user station for a communication network, the first user station comprising:
a communication control unit; and
a timestamp unit including:
a memory;
an address counter;
a first interface by which the timestamp unit interfaces with a host control unit; and
a second interface by which the timestamp unit interfaces with the communication control unit of the first user station;
wherein:
the timestamp unit is configured to receive, via the second interface and from the communication control unit, a respective trigger signal for each of one or more respective messages communicated between the first user station and one or more second user stations, the respective trigger signal triggering the timestamp unit to provide to the respective message a respective timestamp without the timestamp unit receiving the respective message, the providing of the respective timestamp being performed by the timestamp unit:
storing the respective timestamp in the memory at a respective address of the memory; and
transmitting to the communication control unit, via the second interface, an identification of the respective address without transmitting the respective timestamp to the communication control unit, the communication control unit being configured to subsequently obtain the respective timestamp from the timestamp unit using the host control unit and the first interface based on the identification of the respective address;
the timestamp unit is configured to cyclically use the addresses of the memory to store the timestamps;
the timestamp unit includes an address counter to generate the identifications of the addresses by being incremented with each storing of the respective timestamps in the memory so that a value of the address counter corresponds to the respective address at which the respective timestamp is stored in the memory; and
the indications of the respective addresses of the timestamps are transmitted by the timestamp unit to the communication control unit by transmitting to the communication control unit the value to which the address counter is presently set.

10. The user station as recited in claim 9, wherein the timestamp unit and the communication control unit are integrated as separate modules on a semiconductor chip.

11. The user station as recited in claim 9, wherein the timestamp unit and the communication control unit are provided as separate modules on different semiconductor chips.

12. A system, comprising:
a plurality of user stations including a first user station and one or more second user stations; and
a communication line of a communication network via which the plurality of user stations are communicatively coupled for serially transmitting messages between one another;
wherein:
the first user station is configured to connect to a timestamp unit that includes a memory, an address counter, a first interface by which the timestamp unit interfaces with a host control unit, and a second interface by which the timestamp unit interfaces with a communication control unit of the first user station;
the timestamp unit is configured to receive, via the second interface and from the communication control unit, a respective trigger signal for each of one or more respective ones of the messages communicated between the first user station and the one or more second user stations, the respective trigger signal triggering the timestamp unit to provide to the respective message a respective timestamp without the timestamp unit receiving the respective message, the providing of the respective timestamp being performed by the timestamp unit:
storing the respective timestamp in the memory at a respective address of the memory; and
transmitting to the communication control unit, via the second interface, an identification of the respective address without transmitting the respective timestamp to the communication control unit, the communication control unit being configured to subsequently obtain the respective timestamp from the timestamp unit using the host control unit and the first interface based on the identification of the respective address;
the timestamp unit is configured to cyclically use the addresses of the memory to store the timestamps;
the timestamp unit includes an address counter to generate the identifications of the addresses by being incremented with each storing of the respective timestamps in the memory so that a value of the address counter corresponds to the respective address at which the respective timestamp is stored in the memory; and
the indications of the respective addresses of the timestamps are transmitted by the timestamp unit to the communication control unit by transmitting to the communication control unit the value to which the address counter is presently set.

13. The system as recited in claim 12, wherein the communication network is a network in which a exclusive collision-free accesses of the plurality of user stations to a bus line of the communication network is at least temporarily ensured.

14. A system comprising:
a plurality of user stations including a first user station having a communication control unit and one or more second user stations; and
a communication line of a communication network via which the plurality of user stations are communicatively coupled for serially transmitting messages between one another;
wherein:
the communication control unit includes (a) a message memory in which the communication control unit is configured to store messages communicated between the communication control unit the one or more second user stations and (b) an interface to a timestamp unit;
the communication control unit is configured to transmit, via the interface, to the timestamp unit, and for each of one or more respective ones of the messages, a respective trigger signal to trigger the timestamp unit to, without the timestamp unit receiving the respective message, provide to the respective message a respective timestamp by (a) cyclically using addresses of a cyclical memory of the timestamp unit to store the respective timestamps at respective ones of the addresses, (b) using an address counter of the timestamp unit to generate respective identifications of the respective addresses by being incremented with each storing of the respective timestamps in the cyclical memory so that, for each the timestamps, a value of the address counter corresponds to the respective address at which the respective timestamp is stored in the cyclical memory, and (c) for each of the timestamps, transmitting, to the communication control unit and via the interface, the respective identification of the respective address without transmitting the respective timestamp to the communication control unit by transmitting the value to which the address counter is presently set; and
the communication control unit is configured to, subsequent to receiving the respective identification of the respective address, store the respective identification in the message memory and obtain the respective timestamp from the timestamp unit based on the identification of the respective address stored in the message memory.

15. The timestamp unit as recited in claim 2, wherein the timestamp unit includes a connection by which the timestamp unit is configured to output the generated timestamps to another timestamp unit that is configured to provide the timestamps to messages of another user station.

16. The timestamp unit as recited in claim 1, wherein the trigger signals are sent by the communication control unit for all synchronization messages and for all non-synchronization messages received by the communication control unit from the one or more second user stations.

\* \* \* \* \*